Patented Feb. 7, 1928.

1,658,027

UNITED STATES PATENT OFFICE.

ALFRED W. BOSWORTH, OF COLUMBUS, OHIO, ASSIGNOR TO DOUTHITT ENGINEERING CO., OF CHICAGO, ILLINOIS, A CORPORATION OF ILLINOIS.

POWDERED EXTRACT OF MALTED GRAINS AND METHOD OF MAKING SAME.

No Drawing.   Application filed February 7, 1925.  Serial No. 7,713.

My invention relates to the production of a food product which may properly be termed malt extract flour or powder, and the object of the invention is to obtain a powdered extract of malted grains having a slightly acid characteristic and free from a neutralizing ingredient. Another object is to produce a commodity of this character in which the carbohydrates are uncaramelized. Another object is to obtain a product of great solubility and one having a pleasant and slightly acid taste.

To describe one method of carrying out my process I first take barley or any other grain and steep it in water for a suitable period, for example 48 hours more or less, at a temperature in the neighborhood of 68 degrees F. The water should be changed several times, for example approximately once in every 12 hours. This steeping and heating starts the development of the life activity in the grain.

The water is then drained off and the grain is malted by some suitable process, of which more than one is known. For illustration, it is proper to spread the grain on a floor and keep it at such degree of temperature and moisture as will develop the germ. The grain should be turned over once a day or thereabouts to produce a uniform grade of product. This treatment causes the germ to develop in the grain, throwing out small rootlets or acro spires. After seven or eight days these will become one-half to three-quarters inch in length. During this process of malting the enzyme diastase is produced.

After this malting process is completed the grain is kiln dried, care being taken not to destroy the enzyme by overheating. This drying prepares the malted grain for grinding and also removes objectionable odors and flavors. The grain is now ready for extraction and inversion by diastatic action. The sprouted grain is ground and then mixed with water, 2000 pounds of ground grain to 750 gallons of water. The water used should be free from carbonate of sodium, potassium or ammonium.

The mixture is then held at a proper temperature to allow the diastase to invert the starch to malt sugar and dextrines. This may be accomplished by holding the extract at approximately 140 degrees F.

The extract is then drawn off, the grain washed or sparged with water at 140 degrees F. and the sparge water united to the original extract. The whole mixture is then adjusted by the addition of water so that it may contain a proper proportion of solids for desiccation by the succeeding stage which I will presently describe. The proportion may vary for example from 10 to 15% solid matter in the liquid.

The extract is then ready for the desiccation stage, and this desiccation is accomplished by injecting the liquid extract in the form of a finely divided spray into a volume of heated air. This desiccating process is commonly known as the "spray process" or "hot room process", and has the effect of promptly removing the moisture from the solid constituents and causing the latter to fall in the form of flour or powder which is then collected and the moisture-laden air permitted to escape. While this desiccating step may be accomplished in apparatus of different forms, a suitable type is described in Patent No. 1,078,848, granted November 18, 1913, to Gray & Jensen.

During the process of malting and inverting occur certain "side reactions" which result in the production of certain bodies of an acid nature, chief of which is lactic acid. In drying malt extracts by the hot drum method in which liquid is applied to a hot drum and then scraped off, caramelization tends to occur due to the prolonged contact of the liquid with the hot drum; and experience has taught that the presence of an acid tends to promote such caramelization. In order to reduce this tendency toward caramelization the expedient has been resorted to of adding a carbonate or bicarbonate of sodium or potassium. The resulting product is inferior, however, even though the operators may be able to so control the heat that caramelization is more or less prevented, for the product loses its acidity and acidity is desirable to promote the growth of yeast, and also where the powder is used in bread baking, etc. Furthermore the lactic acid produces a definite and pleasant flavor, which is lost in those cases where a neutralizing agent has been introduced. In my process not only is the deliberate introduction of a neutralizing agent omitted but care is taken to see that the water used for extraction and sparging shall be free from ingredients which would neutralize or prevent the production of lactic acid in the liquid extract. In my process the temperature in the desiccating chamber or "hot room" may be as high as 232 degrees F. and yet the contact of the hot air with the liquid is so momentary and the product remains in the chamber for such a short time that no caramelization occurs despite the presence of the lactic acid. The substance remains in the desiccating chamber for less than a minute or at least passes within that period to a zone where the temperature is not much above ordinary room temperature. According to my process it is desirable, if the hot air is at a temperature of about 232 degrees, to remove the powder to a zone of materially reduced temperature within about forty seconds.

It will be observed that in my process the malt remains unfermented by living organisms, such as yeast, and that at no stage of the process does fermentation occur. The product, therefore, is unfermented and is a derivative from an unfermented malted grain.

Powder produced by my process is not only free from the disadvantageous neutralizing agents, but contains the acids produced naturally during the progress of the process, chief of which is lactic acid; hence it is not necessary to deliberately add lactic or any other acid preparatory for use in yeast making, bread baking, etc. The product is highly soluble, and has a distinctive and pleasant acid taste.

Having thus described my invention what I claim as new and desire to secure by Letters Patent is:

1. The within described method of producing an unfermented powder extract of malted grain which consists in malting the grain, grinding it and then mixing it with water free from carbonate of sodium, potassium or ammonium, holding the resultant mixture at a temperature of substantially 140° F. to permit the diastase to convert the starch therein into the malt sugar or maltose and dextrines, drawing off the extract, sparging the remaining malted grain with water at substantially 140° F., uniting the sparge water to the original extract, adjusting the resultant mixture by the addition of water to impart a proper proportion of solids and then desiccating in well-known manner the a derivative from an unfermented malted grain.
to prevent caramelization and whereby a non-caramelized powder is produced.

2. The method of producing unfermented powdered extract of malted grain, consisting in malting the grain, grinding it and then mixing it with water at a temperature to permit the diastase to convert the starch into maltose and dextrines, drawing off the extract, sparging the remaining malted grain with water uniting the sparge water with the original extract at a predetermined temperature, adjusting the resultant mixture by the addition of water and then subjecting the mixture to the momentary action of intensely heated air whereby caramelization is prevented and a resultant non-caramelized powder is produced.

In witness whereof, I have hereunto subscribed my name.

ALFRED W. BOSWORTH.

CERTIFICATE OF CORRECTION.

Patent No. 1,658,027.                                          Granted February 7, 1928, to

ALFRED W. BOSWORTH.

It is hereby certified that error appears in the printed specification of the above numbered patent requiring correction as follows: Page 2, lines 56 and 57, claim 1, strike out the words and period "a derivative from an unfermented malted grain." and insert unfermented water extract of malted grain; and that the said Letters Patent should be read with this correction therein that the same may conform to the record of the case in the Patent Office.

Signed and sealed this 21st day of October, A. D. 1930.

(Seal)                                                                             M. J. Moore,
                                                                              Acting Commissioner of Patents.